United States Patent
Rademacher et al.

(10) Patent No.: US 9,303,613 B2
(45) Date of Patent: Apr. 5, 2016

(54) CONTROL OF VEHICLE ELECTRICAL LOADS DURING ENGINE AUTO STOP EVENT

(75) Inventors: Eric Michael Rademacher, Royal Oak, MI (US); Kirk Pebley, Novi, MI (US); Filip Tomik, Commerce Township, MI (US); David Celinske, Wolverine Lake, MI (US); David Anthony Symanow, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 425 days.

(21) Appl. No.: 13/404,090

(22) Filed: Feb. 24, 2012

(65) Prior Publication Data

US 2013/0226440 A1    Aug. 29, 2013

(51) Int. Cl.
*F02N 11/08* (2006.01)
*F02N 11/00* (2006.01)
*E05F 15/40* (2015.01)
*E05F 15/695* (2015.01)

(52) U.S. Cl.
CPC .......... *F02N 11/0818* (2013.01); *F02N 11/084* (2013.01); *F02N 11/0825* (2013.01); *E05F 15/40* (2015.01); *E05F 15/695* (2015.01); *E05Y 2400/612* (2013.01); *E05Y 2800/40* (2013.01); *E05Y 2900/55* (2013.01); *F02N 2200/063* (2013.01); *F02N 2200/08* (2013.01); *F02N 2200/0809* (2013.01); *Y02T 10/48* (2013.01)

(58) Field of Classification Search
CPC ............ F02N 11/0825; F02N 11/0814; F02N 11/084; F02N 11/0818; F02N 2200/063; F02N 2200/0809

USPC ............ 701/113, 112, 114; 123/179.3, 179.4, 123/179.1, 179.28
See application file for complete search history.

(56) References Cited

U.S. PATENT DOCUMENTS

| | | | |
|---|---|---|---|
| 4,021,677 A | 5/1977 | Rosen et al. |
| 4,284,053 A | 8/1981 | Merrick |
| 4,408,582 A | 10/1983 | Merrick |
| 4,467,761 A | 8/1984 | Hasegawa |
| 4,479,472 A | 10/1984 | Shimamura |
| 4,520,271 A | 5/1985 | Goertler et al. |
| 4,625,281 A | 11/1986 | Deutsch |
| 4,788,487 A | 11/1988 | Picklesimer |
| 4,836,164 A | 6/1989 | Morozumi et al. |
| 4,898,005 A | 2/1990 | Sakurai |
| 5,072,597 A | 12/1991 | Bromley et al. |
| 5,163,399 A | 11/1992 | Bolander et al. |
| 5,216,895 A | 6/1993 | Kawai et al. |
| 5,365,445 A | 11/1994 | Takizawa |
| 5,463,993 A | 11/1995 | Livshits et al. |

(Continued)

FOREIGN PATENT DOCUMENTS

| | | |
|---|---|---|
| DE | 3307220 | 9/1984 |
| EP | 2138712 A1 | 12/2009 |

(Continued)

*Primary Examiner* — Mahmoud Gimie
(74) *Attorney, Agent, or Firm* — David B. Kelley; Brooks Kushman P.C.

(57) ABSTRACT

A vehicle includes an engine, an electrical load and a stop/start system. The stop/start system selectively auto stops the engine when a speed of the vehicle is approximately zero, and in response to a request to activate the electrical load while the engine is auto stopped, auto starts the engine prior to activating the electrical load.

6 Claims, 2 Drawing Sheets

(56) References Cited

U.S. PATENT DOCUMENTS

| | | |
|---|---|---|
| 5,559,704 A | 9/1996 | Vanek et al. |
| 5,806,485 A | 9/1998 | DeGeorge |
| 6,037,749 A | 3/2000 | Parsonage |
| 6,226,585 B1 | 5/2001 | Cullen |
| 6,379,283 B1 | 4/2002 | Cullen |
| 6,429,539 B1 * | 8/2002 | Suzuki et al. ............... 290/40 A |
| 6,553,958 B1 | 4/2003 | Kolmanovsky et al. |
| 6,564,774 B2 | 5/2003 | Ellims et al. |
| 6,608,394 B2 | 8/2003 | Osada et al. |
| 6,668,224 B2 | 12/2003 | Kawai et al. |
| 6,755,032 B1 | 6/2004 | Kotwicki et al. |
| 6,763,296 B2 | 7/2004 | Aldrich, III et al. |
| 6,805,090 B2 | 10/2004 | Bertness et al. |
| 6,845,305 B1 | 1/2005 | Raftari et al. |
| 7,017,360 B2 | 3/2006 | Kotwicki et al. |
| 7,032,393 B2 | 4/2006 | Tamai et al. |
| 7,552,705 B2 | 6/2009 | Serkh et al. |
| 7,635,922 B2 | 12/2009 | Becker |
| 7,745,953 B2 | 6/2010 | Puccetti et al. |
| 8,205,594 B2 | 6/2012 | Fore et al. |
| 8,406,954 B2 | 3/2013 | Whitney et al. |
| 8,560,202 B2 | 10/2013 | Pebley et al. |
| 2003/0018415 A1 | 1/2003 | Sonobe et al. |
| 2003/0233835 A1 | 12/2003 | Tomita et al. |
| 2004/0112074 A1 | 6/2004 | Komura et al. |
| 2005/0044873 A1 | 3/2005 | Tamai et al. |
| 2005/0067200 A1 * | 3/2005 | Jiang et al. ............... 180/65.2 |
| 2005/0193747 A1 | 9/2005 | Kajimoto et al. |
| 2006/0028778 A1 | 2/2006 | O'Gorman et al. |
| 2006/0137643 A1 * | 6/2006 | Thompson et al. ........ 123/179.4 |
| 2007/0007056 A1 * | 1/2007 | Bowers et al. ............... 180/65.2 |
| 2007/0255488 A1 | 11/2007 | Okubo et al. |
| 2008/0306670 A1 | 12/2008 | Masterson et al. |
| 2009/0015203 A1 | 1/2009 | Oakes |
| 2009/0024264 A1 | 1/2009 | Aldrich, III et al. |
| 2009/0241883 A1 * | 10/2009 | Nagoshi et al. ............ 123/179.4 |
| 2010/0042277 A1 | 2/2010 | Naik et al. |
| 2010/0050671 A1 | 3/2010 | Kahn et al. |
| 2010/0125383 A1 | 5/2010 | Caouette |
| 2010/0145562 A1 | 6/2010 | Moran |
| 2010/0163220 A1 | 7/2010 | Nakajima |
| 2012/0083988 A1 | 4/2012 | Miyata et al. |
| 2012/0109469 A1 | 5/2012 | Pebley et al. |
| 2012/0253595 A1 | 10/2012 | Oakes |
| 2012/0271525 A1 | 10/2012 | Bucci et al. |
| 2012/0304670 A1 | 12/2012 | Kumar et al. |
| 2013/0018569 A1 | 1/2013 | Sangameswaran et al. |
| 2013/0060444 A1 | 3/2013 | Matsunaga et al. |

FOREIGN PATENT DOCUMENTS

| | | |
|---|---|---|
| JP | 58209613 | 12/1983 |
| JP | 10304503 A | 11/1998 |
| WO | 2008089935 A1 | 7/2008 |

* cited by examiner

000# CONTROL OF VEHICLE ELECTRICAL LOADS DURING ENGINE AUTO STOP EVENT

TECHNICAL FIELD

This disclosure relates to micro-hybrid or stop/start vehicles and controlling electrical loads therein.

BACKGROUND

A micro-hybrid or stop/start vehicle can selectively turn its engine off during portions of a drive cycle to conserve fuel. As an example, a stop/start vehicle can turn its engine off while the vehicle is stopped rather than allow the engine to idle. The engine can then be restarted, for example, when a driver steps on the accelerator pedal.

SUMMARY

A vehicle includes an engine, an electrical load, and a battery arranged to supply electric current to the electrical load. The vehicle also includes a stop/start system including one or more controllers that selectively auto stop and auto start the engine and, in response to a request to activate the electrical load while the engine is auto stopped, auto start the engine prior to activating the electrical load based on a voltage of the battery. The one or more controllers can auto start the engine prior to activating the electrical load if the voltage of the battery is less than a predetermined value. The one or more controllers can further activate the electrical load if the voltage of the battery is greater than or equal to a predetermined value. The vehicle can further include a starter motor that starts the engine. The one or more controllers can further activate the electrical load if the engine is running and the starter motor is off. The electrical load can be a motor.

A method for controlling an electrical load of a stop/start vehicle includes, in response to receiving a request to activate the electrical load while an engine of the vehicle is auto stopped, auto starting the engine prior to activating the electrical load if a voltage of a battery arranged to supply electric current to the electrical load is less than a predetermined value. The method can further include activating the electrical load if the voltage of the battery is greater than or equal to the predetermined value. The method can further include activating the electrical load if the engine is running and a starter motor arranged to start the engine is off. The electrical load can be a motor.

A vehicle includes an engine, an electrical load and a stop/start system. The stop/start system selectively auto stops the engine when a speed of the vehicle is approximately zero, and in response to a request to activate the electrical load while the engine is auto stopped, auto starts the engine prior to activating the electrical load. The vehicle can further include a battery arranged to provide electric current to the electrical load. The engine can be auto started prior to activating the electrical load if a voltage of the battery is less than a predetermined value. The stop/start system can further activate the electrical load if the voltage of the battery is greater than the predetermined value. The vehicle can further include a starter motor arranged to start the engine. The stop/start system can further activate the electrical load if the engine is running and the motor is off. The electrical load can be a motor.

DETAILED DESCRIPTION

Figure 1:
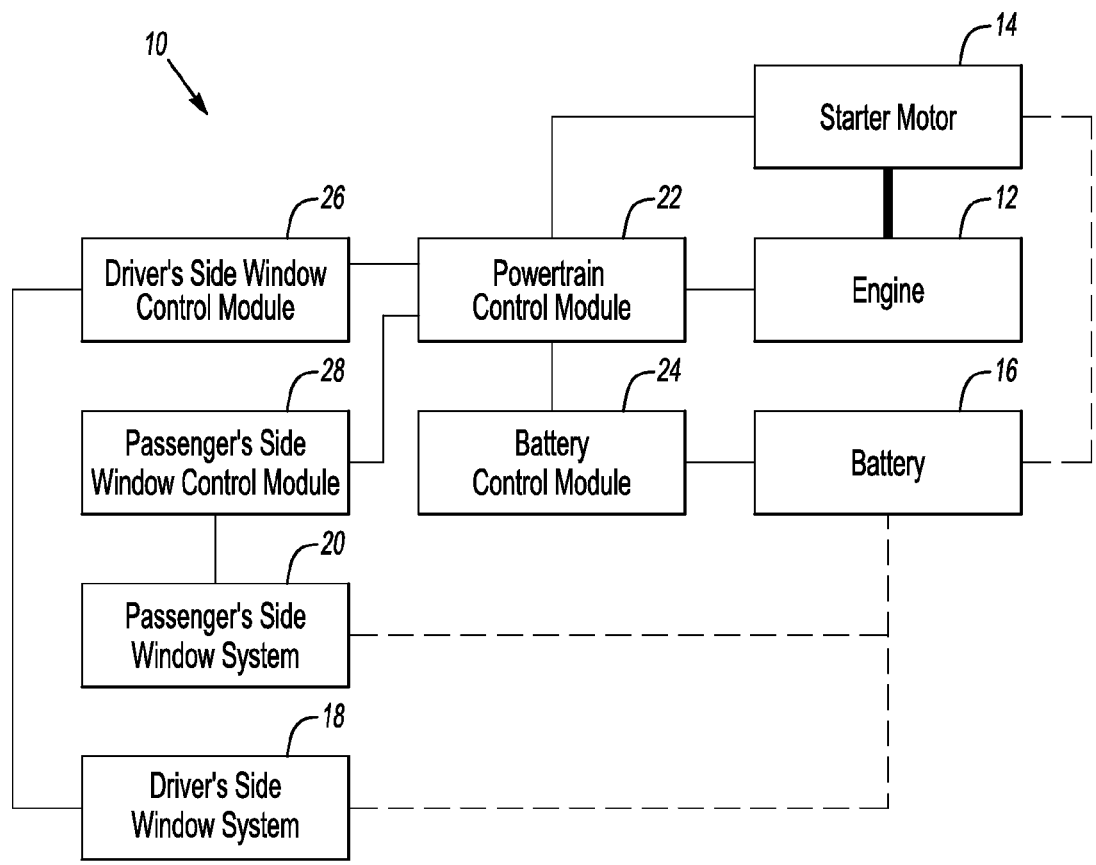
FIG. 1 is a block diagram of a micro-hybrid or stop/start vehicle.

Embodiments of the present disclosure are described herein; however, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A battery of a micro-hybrid or stop/start vehicle can store and provide electrical energy for consumption by electrical loads. These electrical loads can include devices to open/close windows, devices to open/close door locks, power electronics circuitry, control module circuitry, AC/DC converters, audio amplifiers, resistive heating elements for seats, etc. Certain circuitry can require a minimum threshold input voltage for proper operation. That is, these circuits can experience faults or other issues if the input voltage falls below the minimum threshold. The input voltage is typically a function of the battery voltage: If the battery voltage is sufficiently high, the input voltage will be greater than the minimum threshold voltage; and if the battery voltage is low, the input voltage will be less than the minimum threshold voltage.

Electrical loads are supported by electrical energy from the battery. The battery, however, is not charged during engine off periods as the alternator (or similar device) is not activated during these periods. Hence, the battery voltage can decrease during engine off periods if energy from the battery is used to support the electrical loads. It has been discovered that activation of certain electrical loads in combination during engine off periods can cause the battery voltage to decrease such that the minimum input threshold voltage cannot be maintained depending on the initial voltage of the battery. For example, the combined operation of a starter motor and a motor to close a passenger's side window can cause battery voltage to fall below that required to maintain a minimum input threshold voltage for electrical loads.

Activation of customer controlled electrical loads can be inhibited during engine off periods to reduce the chances of causing the battery voltage to fall below that required to maintain a minimum input threshold voltage for electrical loads. For example, a driver's request to open or close a window can be ignored if the engine is off to reduce the chances that the motor used to close the window would be operating at the same time the starter motor would be activated to start the engine. Such a strategy, however, can cause customer dissatisfaction if requests are frequently ignored. Hence, certain strategies described herein inhibit activation of electrical loads during engine off periods based on battery voltage. If, for example, battery voltage is less than a threshold value, customer requests for activation of electrical loads are ignored; and if the battery voltage is greater than the threshold value, customer requests for activation of electrical loads are honored. Certain strategies described herein include starting the engine in response to customer requests for activation of electrical loads if battery voltage is less than a threshold value. Other strategies are also contemplated.

Referring to FIG. 1, a vehicle 10 includes an engine 12, starter motor 14, battery 16, and driver's and passenger's side window systems 18, 20 (windows, motors arranged to move the windows, etc.) The vehicle 10 also includes a powertrain control module 22, battery control module 24, and driver's side and passenger's side window control modules 26, 28. The control modules (or controllers), in this example, collectively form a stop/start system. Other stop/start systems can, of course, have a fewer or greater number of controllers and/or associated devices. Additionally, other vehicles can include different or other systems such as automatic seat systems, window defroster systems, heated seat systems, entertainment systems, power lift gate systems, etc. and associated control modules. Likewise, other vehicles can include a fewer or greater number of control modules. All control functions described herein, for example, can be performed by a single controller. Still other configurations are also contemplated.

The engine 12 and starter motor 14 are mechanically connected as indicated by thick line. The battery 16 is electrically connected with the starter motor 14, and motors of the driver's side and passenger's side window systems 18, 20 as indicated by dashed line. The engine 12, starter motor 14, battery control module 24, and driver's side and passenger's side window control modules 26, 28 are in communication with/under the control of the powertrain control module 22 as indicated by thin line. The battery 16 is in communication with/under the control of the battery control module 24 as indicated by thin line. The driver's side and passenger's side window systems 18, 20 are in communication with/under the control of the driver's side and passenger's side window control modules 26, 28 respectively as indicated by thin line.

While the vehicle 10 is stopped, the powertrain control module 22 can shut down the engine 12 (instead of allowing it to idle) to conserve fuel. These auto stop events are typically initiated if one or more criteria are met such as vehicle speed being approximately zero, etc. as known in the art. The powertrain control module 22 can restart (auto start) the engine 12 if, for example, a driver of the vehicle 10 steps on the accelerator pedal.

The battery control module 24, while the engine 12 is auto stopped, monitors a voltage of the battery 16 and periodically reports this data to the powertrain control module 22. The powertrain control module 22 examines this data and issues status updates on the basis thereof. If, for example, the battery voltage is greater than or equal to a predetermined threshold voltage, the powertrain control module 22 sets a status flag to 0; and if the battery voltage is less than the predetermined threshold voltage, the powertrain control module 22 sets the status flag to 1.

The driver's side and passenger's side window control modules 26, 28 (or other system controllers as the case may be) each examine the status flag prior to responding to a request to open windows associated with the driver's side and passenger's side window systems 18, 20 respectively (or prior to responding to requests to activate other systems such as devices to open/close door locks, power electronics circuitry, control module circuitry, AC/DC converters, audio amplifiers, resistive heating elements for seats, etc.) That is, the driver's side window control module 26, for example, examines the status flag in response to receiving a request to open the window associated with the driver's side window system 18. If the flag has a value of 0, the driver's side window control module 26 honors the request and opens the window associated with the driver's side window system 18. If the flag has a value of 1, the driver's side window control module 26 issues a request to the powertrain control module 22 to start the engine 12. The powertrain control module 22, in response, commands the starter motor 14 to start the engine 12. After the engine 12 is running, the driver's side window control module 26 honors the request and opens the window associated with the driver's side window system 18.

In one scenario, operation of the engine 12 causes an alternator or similar device (not shown) to charge the battery 16. This raises the voltage of the battery 16 above the predetermined threshold voltage. As a result, the powertrain control module 22 sets the status flag to 1, which prompts the driver's side window control module 26 to honor the request. In another scenario, operation of the engine 12 itself is a separate condition which can prompt the driver's side window control module 26 to honor the request. The powertrain control module 22, for example, can report that the engine 12 is running. In response to this information, the window control module 26 honors the request.

Figure 2:
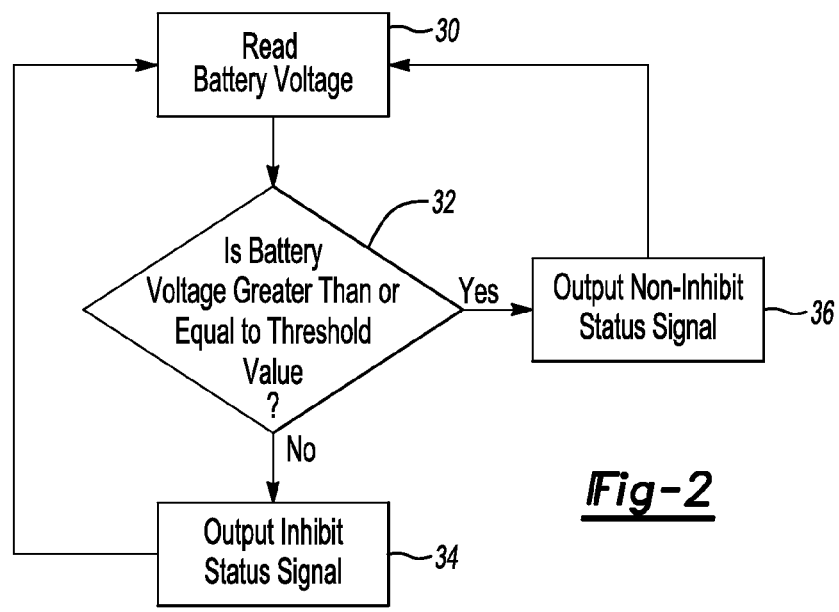
FIG. 2 is a flow chart illustrating an algorithm for monitoring and reporting battery voltage.

Referring to FIG. 2, battery voltage is read at operation 30. At operation 32, it is determined whether the battery voltage is greater than or equal to a threshold value. This threshold can be determined via testing or simulation and be set to a value, for example, that strikes a desired balance between permitting the system to satisfy customer requests and reducing the chances that battery voltage will fall below that required to maintain a minimum input threshold voltage for electrical loads. The threshold value, for example, can reflect end of life battery conditions, etc. If no, an inhibit status signal is output at operation 34. The algorithm then returns to operation 30. Returning to operation 32, if yes, a non-inhibit status signal is output at operation 36. The algorithm then returns to operation 30.

Figure 3:
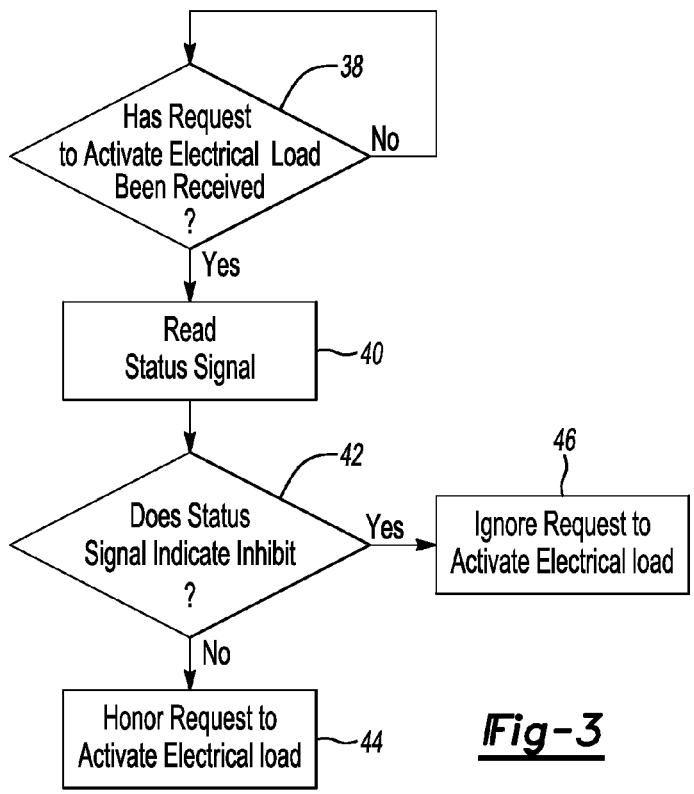
FIGS. 3 and 4 are flow charts illustrating algorithms for controlling the activation of electrical loads.

Referring to FIG. 3, it is determined whether a request to activate an electrical load has been received at operation 38. If no, the algorithm returns to operation 38. If yes, the status signal discussed with reference to FIG. 2 is read at operation 40. At operation 42, it is determined whether the status signal indicates an inhibit condition. If no, the request to activate the electrical load is honored at operation 44. Returning to operation 42, if yes, the request to activate the electrical load is ignored at operation 46.

Figure 4:
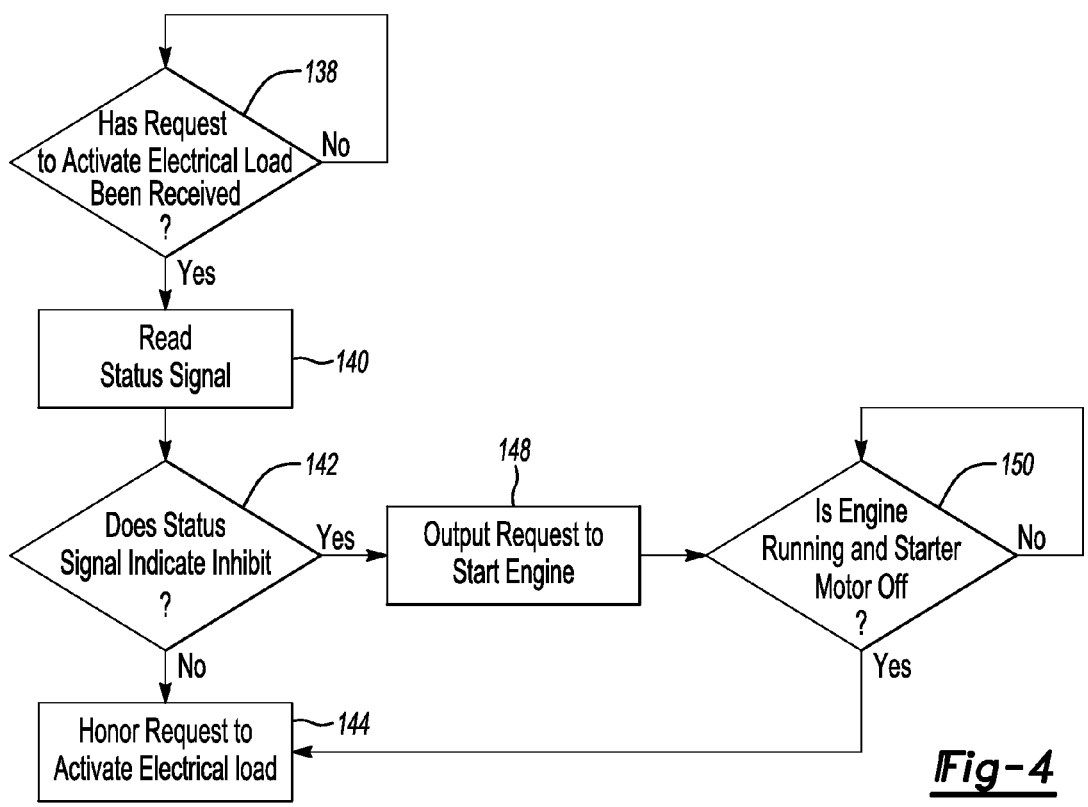

Referring to FIG. 4, it is determined whether a request to activate an electrical load has been received at operation 138. If no, the algorithm returns to operation 138. If yes, the status signal discussed with reference to FIG. 2 is read at operation 140. At operation 142, it is determined whether the status signal indicates an inhibit condition. If no, the request to activate the electrical load is honored at operation 144. Returning to operation 142, if yes, a request to start the engine is output an operation 148. At operation 150, it is determined whether the engine is running and the starter motor is off. If no, the algorithm returns to operation 150. If yes, the algorithm proceeds to operation 144.

As an alternative to operation 150, it can instead be determined whether the status signal indicates an inhibit condition. This example assumes that operation of the engine will eventually result in the battery voltage exceeding the threshold value discussed with reference to FIG. 2. If no, the algorithm continues to wait. If yes, the algorithm proceeds to operation 144.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure and claims. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and could be desirable for particular applications.

What is claimed is:

1. A vehicle comprising:
   an engine;
   a motor arranged to move a window of the vehicle; and
   a stop/start system including one or more controllers configured to, in response to a request to activate the motor while the engine is auto stopped, selectively auto start the engine prior to activating the motor based on a battery voltage.

2. The vehicle of claim 1, wherein selectively auto starting the engine prior to activating the motor based on a battery voltage includes auto starting the engine provided that the battery voltage is less than a predetermined value.

3. A method for controlling a motor of a stop/start vehicle, the method comprising:
   in response to receiving, while an engine of the vehicle is auto stopped, a request to activate a motor arranged to adjust a position of a seat of the vehicle, auto starting the engine prior to activating the motor provided that a voltage of a battery arranged to supply current to the motor is less than a predetermined value.

4. The method of claim 3 further comprising activating the motor provided that the voltage of the battery is greater than or equal to the predetermined value.

5. A vehicle comprising:
   an engine;
   an entertainment system; and
   a stop/start system configured to selectively auto stop the engine when a speed of the vehicle is approximately zero, and in response to a request to activate the entertainment system while the engine is auto stopped, to auto start the engine prior to activating the entertainment system.

6. The vehicle of claim 5 further comprising a battery arranged to provide current to the entertainment system, wherein the stop/start system is further configured to auto start the engine prior to activating the entertainment system provided that a voltage of the battery is less than a predetermined value.

* * * * *